(12) United States Patent
Nayak et al.

(10) Patent No.: US 9,847,078 B2
(45) Date of Patent: Dec. 19, 2017

(54) MUSIC PERFORMANCE SYSTEM AND METHOD THEREOF

(71) Applicant: SENSIBOL AUDIO TECHNOLOGIES PVT. LTD., Mumbai (IN)

(72) Inventors: Nagesh Nayak, Mumbai (IN); Sharath Adavanne, Mysore (IN); Preeti Rao, Mumbai (IN); Sachin Pant, Dehradun (IN); Sujeet Kini, Thane (IN); Vishweshwara Rao, Mumbai (IN)

(73) Assignee: SENSIBOL AUDIO TECHNOLOGIES PVT. LTD., Powai, Mumbai (IN)

( * ) Notice: Subject to any disclaimer, the term of this patent is extended or adjusted under 35 U.S.C. 154(b) by 0 days.

(21) Appl. No.: 15/323,925

(22) PCT Filed: Jul. 7, 2015

(86) PCT No.: PCT/IN2015/000276
§ 371 (c)(1),
(2) Date: Jan. 4, 2017

(87) PCT Pub. No.: WO2016/009444
PCT Pub. Date: Jan. 21, 2016

(65) Prior Publication Data
US 2017/0140745 A1    May 18, 2017

(30) Foreign Application Priority Data
Jul. 7, 2014    (IN) .......................... 1880/MUM/2014

(51) Int. Cl.
*G10H 1/36*    (2006.01)
*G10H 7/00*    (2006.01)

(52) U.S. Cl.
CPC ....... *G10H 1/366* (2013.01); *G10H 2210/051* (2013.01); *G10H 2210/066* (2013.01);
(Continued)

(58) Field of Classification Search
CPC ............. G10H 1/366; G10H 2210/051; G10H 2210/066; G10H 2210/076;
(Continued)

(56) References Cited

U.S. PATENT DOCUMENTS

| 5,636,323 A | 6/1997 | Umemoto et al. |
| 7,973,230 B2 | 7/2011 | Mahowald |

(Continued)

OTHER PUBLICATIONS

International Search Report and Written Opinion dated Jan. 14, 2016 in International Application No. PCT/IN2015/000276, 12 pages.

*Primary Examiner* — Jeffrey Donels
(74) *Attorney, Agent, or Firm* — Rothwell, Figg, Ernst & Manbeck, P.C.

(57) ABSTRACT

A method for processing a music performance, the method comprising the steps of: receiving a first media signal from a media source; analyzing the first media signal to extract any media signal characteristics; creating a reference media signal by suppressing at-least a predominant sound source of the first media signal; reproducing the reference media signal while receiving a users media signal from an input device to generate a second media signal; analyzing the second media signal to extract any media signal characteristics; processing the characteristics of the second media signal in isolation or in combination with the characteristics of the first media signal; and generating feedback for the music performance based upon the processed media signals.

19 Claims, 7 Drawing Sheets

(52) U.S. Cl.
CPC . *G10H 2210/076* (2013.01); *G10H 2210/081* (2013.01); *G10H 2210/091* (2013.01); *G10H 2210/331* (2013.01); *G10H 2210/391* (2013.01); *G10H 2240/141* (2013.01)

(58) Field of Classification Search
CPC ....... G10H 2210/081; G10H 2210/091; G10H 2210/331; G10H 2210/391; G10H 2240/141
USPC .......................................................... 84/610
See application file for complete search history.

(56) References Cited

U.S. PATENT DOCUMENTS

| | | |
|---|---|---|
| 8,634,759 B2 | 1/2014 | Bates et al. |
| 2014/0105411 A1 | 4/2014 | Santos et al. |
| 2014/0180674 A1 | 6/2014 | Neuhauser et al. |

MUSIC PERFORMANCE SYSTEM AND METHOD THEREOF

CROSS REFERENCE TO RELATED APPLICATION(S)

This application is a 35 U.S.C. §371 National Stage of International Patent Application No. PCT/IN2015/000276, filed Jul. 7, 2015, designating the United States, which claims priority upon Indian Patent Application No. 1880/MUM/2014, filed Jul. 7, 2014. The disclosures of each of the above-referenced applications are herein incorporated by reference in their entirety.

FIELD OF THE INVENTION

The present invention relates to a music performance system and method thereof. In particular, the invention provides a method and system with capabilities such as media-characteristics extraction, media creation, scoring a performance, providing feedback to user and version creation.

BACKGROUND OF THE INVENTION

Karaoke is a term used to describe a singer that sings along with a prerecorded musical accompaniment. Typical karaoke systems enable users to sing along with a background music audio track and display the lyrics of the song on a visual interface. These systems usually focus on one or the other aspect of the singing experience such as live-performance, user-recording or music learning.

Firstly, display of required metadata or characteristic, such as time-aligned lyrics & melody information, is a typical functionality of any karaoke system. An extended & detailed characteristics representation, extracted from the original polyphonic music track, is required for a comprehensive vocal performance system that is expected to provide detailed performance analysis and enhancements to user recordings. However, methods in the prior art have described extraction of features related to melody, rhythm, loudness, and timbre used for scoring or transcribing music data (audio to music score).

Secondly, karaoke systems play background music of a song so that a user can perform using such background music. Ideally the background music should be the original music. However such music is often not separately available or comes at a high premium cost. Most karaoke systems use re-created or re-recorded background music. Some systems do attempt to extract the original background music by the elimination of the main or lead voice from the original track, which is also known as de-soloing. The main voice could be that of a human singer or of a melodic instrument. Such systems require the original song to be available in stereo (2-channel) format in which the vocals are generally panned in the center of the stereo image. These systems attempt to eliminate the vocals using some processing to cancel the center channel. However, such methods suffer from several drawbacks listed as follows:

Other instruments that are panned in the center are removed as well;

Although some systems attempt to process the vocals in isolation by limiting the frequency range of processing to the vocal frequency range, this still does not help with several instruments whose frequency ranges overlap with the voice;

For several songs the vocals are not panned to the center, which results in incomplete removal;

A lot of popular music was recorded decades ago when using monophonic recording technology, and are not available in stereo format; and They are not able to suppress effects, such as reverberation and echo, which have been applied to the original singer's voice.

Thirdly, for the purpose of providing a score and feedback to a user, a comprehensive evaluation of a user's singing proficiency would require comparing the user's recording with the original singer's rendition on different musical dimensions viz. pitch correctness, rhythm correctness, pitch-modulation, vocal dynamics, vocal pitch range, pronunciation of lyrics, and voice quality. Most scoring systems in the prior art consider between 2-3 of the above dimensions of scoring, typically only the first two, viz. pitch and timing correctness. Further the evaluation of the pitch, which is often the single most important musical attribute, is usually restricted to musical notes (in a standard scale). This gives an incomplete, and often incorrect, assessment of singer proficiency since vocal pitch trajectory is a smooth and continuous variation (often with a lot of modulation) unlike a sequence of discrete notes (as would be played on a piano). Utilizing a singing evaluation system for use in a contest or audition (categorizing singers based on their singing attempts without human intervention) or in music learning, would involve detailed scoring along all the above dimensions.

Fourthly, every singing session can result in creation of a new version of the song if the user's voice is recorded during singing. However, the user's recorded voice as it is may not be attractive or exciting enough for the version to proliferate. A system should behave analogous to a recording studio, where the user's voice is enhanced and then appropriately mixed with the background music, resulting in a composite cover version track. Enhancements typically take the form of vocal effects. Vocal effects are broadly divided into two categories: transformative and corrective. Transformative effects involve processing that change the voice identity, such as, helium, chipmunk, duck, gender transformation (male-female and vice-versa) etc. and also effects like echo and reverb. Corrective effects enhance the quality of the recording, by actually correct singing errors in the user's recording. An example of the latter is the correction of the pitch of the user-singing. Pitch correction effects usually only correct the user pitch to a discrete reference note from a musical scale. As mentioned previously, the vocal pitch trajectory is a smooth and continuous variation (often with a lot of modulation) unlike a sequence of discrete notes (as would be played on a piano). So such correction results in a drastic loss of naturalness in the user's voice and often only sounds corrected when the user's pitch is closer to the correct note. Although there are correction mechanisms that change the pitch of the user-singing to another reference voice-pitch, these rely heavily on perfect timing co-incidence of the user and the reference, which is not the case for amateur singers requiring correction.

There has thus been a persistent need for music performance systems, which have typical karaoke functionality and can display feedback about singing proficiency in comparison with a benchmark. Furthermore, on completion of singing, such music performance system give the user comprehensive, credible & detailed feedback on multiple musical dimensions, and also make suggestions for user improvement and recommend suitable songs for the user to attempt. Such system should also be able to identify cases where the user is cheating in order to get a high score e.g. by playing back the original song into the system or just humming the melody without uttering the lyrics and facilitate the creation of an attractive user version of the song, by enhancing the user-recording in various ways, and time-aligning & mixing it with the background music.

The music performance system discussed in the preceding paragraph should extend the stated functionalities for scenarios in which the gender of the user is different from that of the original singer i.e. male singing a female song and vice-versa and also for songs in which there are two singers (duets) by treating each singer's part separately. Additionally, the system should enable the stated functionalities on different platforms, such as computers and hand-held devices, and over a different media, such as mobile and Internet networks and in real-world environments in which the user-recordings may be noisy. Often the user-voice recording on such platforms and recording transmission over such media result in a variable delay or time-lag of the user-recording as compared to the background music. A method of time-alignment then becomes critical to enable correct performance analysis and cover-version creation.

Thus, such music performance system can be used not only for music entertainment i.e. a karaoke singing experience, but will also be suitable for music tutoring, singing contests & auditions, and as a cover version creation system.

Such a system can be used for music performances including singing voice and other musical instruments.

The present invention is contrived in consideration of the circumstances mentioned hereinbefore, and is intended to provide a comprehensive music performance system with aforementioned capabilities.

SUMMARY OF THE INVENTION

Accordingly, the present invention in one aspect provides a method for processing a music performance, the method comprising the steps of receiving a first media signal from a media source, analysing the first media signal to extract any media signal characteristics, creating a reference media signal by suppressing at-least a predominant sound source of the first media signal, reproducing the reference media signal while receiving a users media signal from the input device to generate a second media signal, analysing the second media signal to extract any media signal characteristics, processing the characteristics of the second media signal in isolation or in combination with the characteristics of the first media signal, and generating feedback for the music performance based upon the processed media signals.

In another aspect, the present invention provides a system for processing a music performance, the system comprising a receiver for receiving a first media signal from a media source and a user's voice from an input device, and a processor configured for analysing the first media signal to extract any media signal characteristics, creating a reference media signal by suppressing at-least a predominant sound source of the first media signal, reproducing the reference media signal while receiving the users media signal from the input device to generate a second media signal, analysing the second media signal to extract any media signal characteristics, processing the characteristics of the second media signal in isolation or in combination with the characteristics of the first media signal; and generating feedback for the music performance based upon the processed media signals.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

Figure 1:
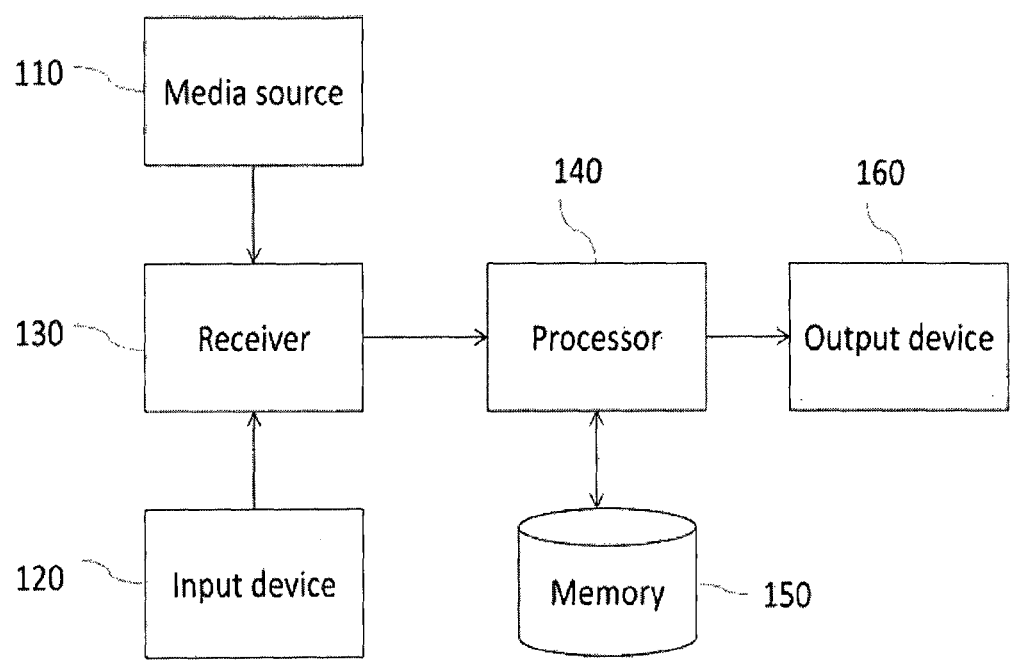
FIG. 1 shows a system for processing a music performance in accordance with an embodiment of the invention.

The invention may be better understood and further advantages and uses thereof more readily apparent when considered in view of the following detailed description of exemplary embodiments, taken with the accompanying drawings. These embodiments describe only a few of the various ways in which the principles of various other embodiments may be realized and the described embodiments are intended to include all such embodiments and their equivalents and the reference numerals used in the accompanying drawings correspond to the like elements throughout the description.

FIG. 1 shows a system 100 for processing a music performance in accordance with an embodiment of the invention. The system includes a media source 110, an input device 120, a receiver 130, a processor 140, a memory 150 and an output device 160.

As shown, the media source and the input device are connected to the receiver through which the system receives media signals. According to the present invention a first media signal is provided to the receiver through the media source and a user media signal is provided through the input device. The media source may be a music player, an Internet streamed mono/stereo version of an audio or a video or a signal or downloaded from an optical disk, webserver, or a storage device. The input device is preferably a microphone. Alternately, the input device may also be a device capable of providing a recorded user media signal to the system. The first media signal can be an audio or a video signal i.e. a song in the form of an audio or a video. The user media signal is a song performed by a user, which may be a live performance or a recorded audio or video version of the performance.

The media signals are further provided to the processor. As shown the processor is coupled to a memory which has a machine executable code that causes the processor to process at-least one of the media signals to extract characteristics of the media signals and/or create a reference media signal and/or generate a feedback of the music performance and/or create a third media signal from the media signals. The processed signals are then provided to the output device. The output device preferably is an audio-video device.

In an example embodiment, the invention may be implemented as an application running on a portable device, such as a cell phone, computer, laptop, or other dedicated portable electronic device.

Figure 2:
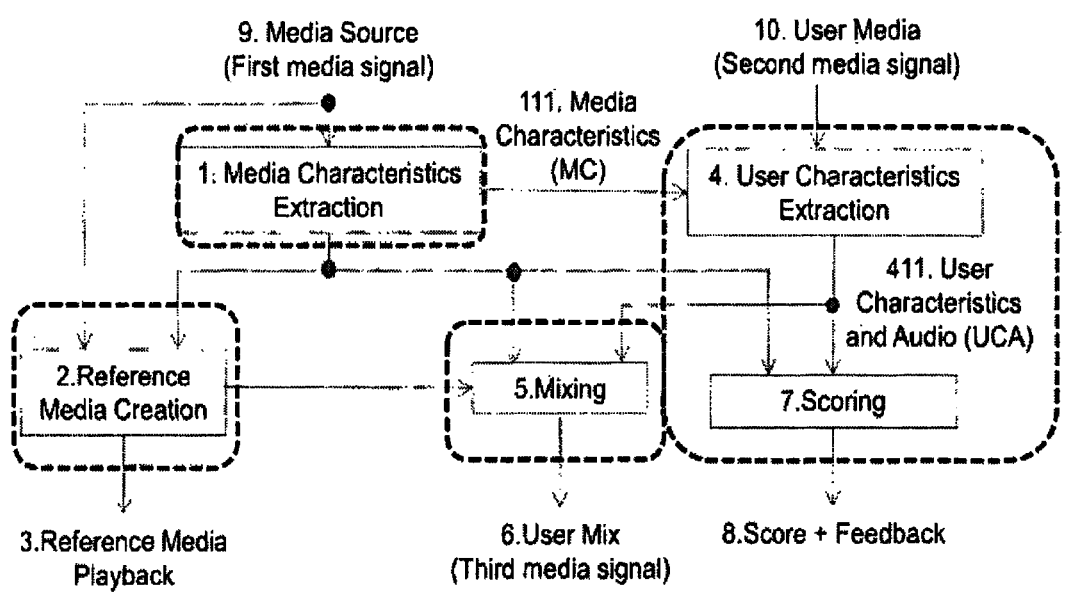
FIG. 2 illustrates processing of the music performance in accordance with an embodiment of the invention.

FIG. 2 illustrates processing of a music performance of a user on the system of FIG. 1 in accordance with an embodiment of the invention. Broadly, the processing of the music performance is divided into three phases—pre-performance, performance, and post-performance. In the pre-performance phase a first media signal is analysed for media signal metadata or characteristics extraction 1. The extracted media signal characteristics are further used to create a reference media signal. The reference media signal is then further used in the post-performance phase. Further, the extracted media signal characteristics are then used for generating feedback 4 and creating a third audio signal 5. In the performance phase, a user media signal is received while the reference media signal is reproduced to generate a second media signal. Accordingly, the second media signal includes the reference media signal and the user media signal. Thereafter, the second media signal is analysed to extract media signal characteristics of second media signal. The extracted characteristics of the second media signal are then processed in isolation or in combination with the characteristics of first media signal to generate a feedback of the music performance i.e. user-performance so as to provide a singing score and/or visual feedback 11. In the post-performance phase, as shown in the figure, a third media signal (User mix) is created by combining the second media signal and the reference media signal. Accordingly, the present invention provides a third media signal along with a feedback of the performance of the user's media signal which contains detailed analysis for the entire song with specific feedback on possible improvements.

Figure 3:
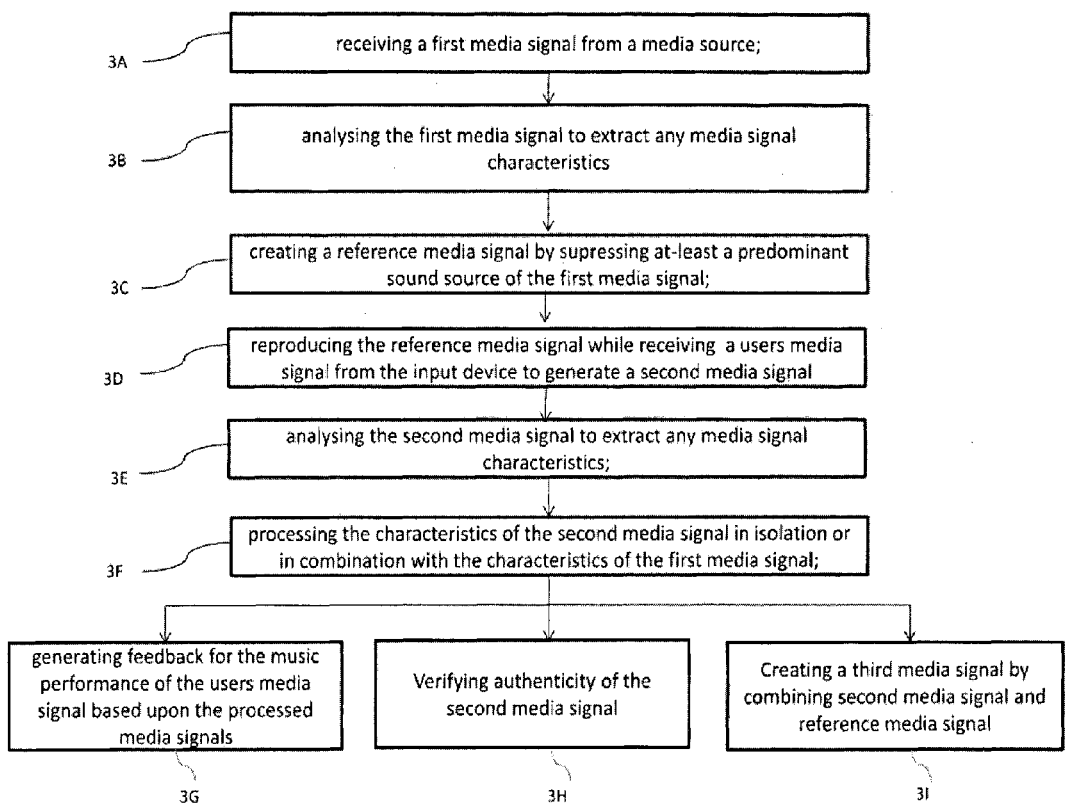
FIG. 3 shows a flowchart of a method for processing a music performance in accordance with an embodiment of the invention.

FIG. 3 shows a flowchart of a method for processing a music performance in accordance with an embodiment of the invention.

At step 3A, a first media signal from a media source is received at a receiver. Thereafter, at step 3B, the first media signal is analysed to extract any media signal characteristics. The extracted media signal characteristics include timestamps, pitch, onsets, tempo, notes, dynamics, pitch modulations, which are represented as a combination of a continuous pitch curve and a sequence of steady notes, peaks and harmonic tracks, octave of the predominant sound source, song-fingerprint and time-stamp of lyrics.

Figure 4:
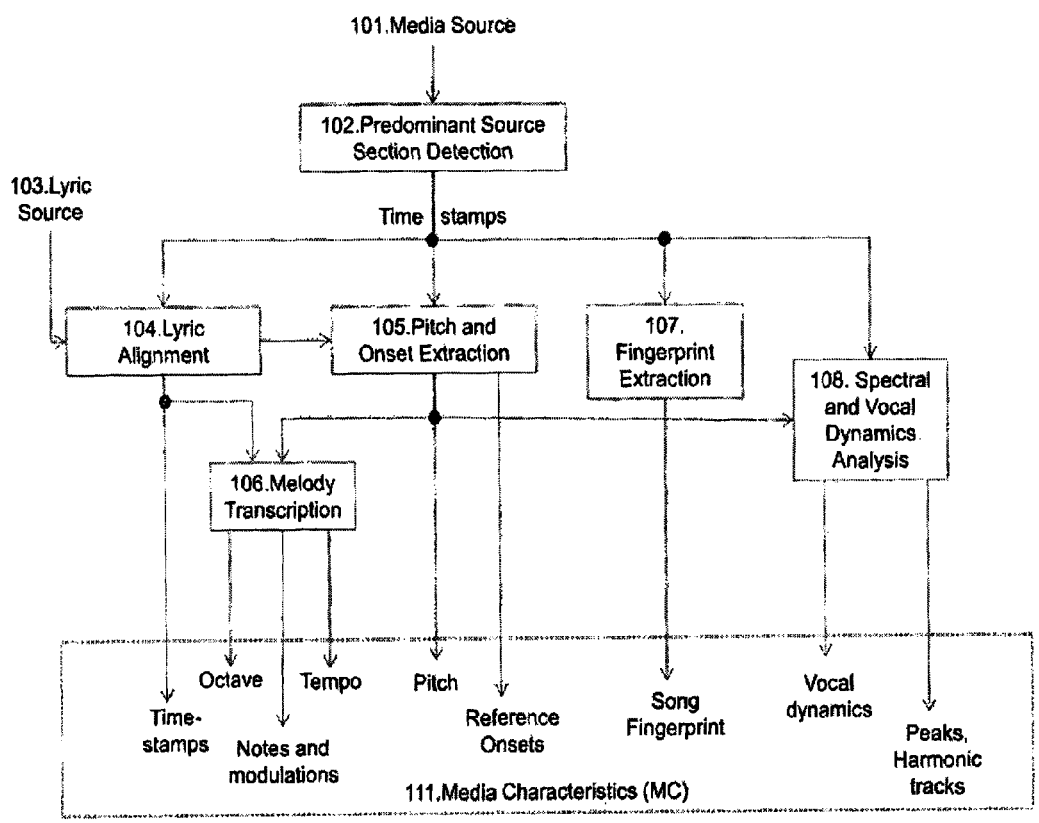
FIG. 4 illustrates extraction of media signal characteristics in accordance with an embodiment of the invention.

As shown in FIG. 4, firstly, the pre-dominant source of the media signal is detected i.e. at-least vocal and non-vocal components of the first media signal are detected 102. The vocal component may be enhanced for further use. The corresponding lyrics text file 103 sources the words of the song that are then aligned at the syllable level with the vocal segments of the audio. The vocal segments are subjected to pitch extraction 105 and the continuous pitch contour is segmented into structural segments such as chorus and verse and further, into notes and ornaments by the melody transcription module 106. Other by-products of melody transcription 106 are the beat locations and tempo and scale of the song. Song difficulty is estimated by analyzing the vocal pitch range, presence of ornamentation, short-note sequences, and long-notes.

Referring to FIG. 4, music source 101 can be any source (CD/DVD, Internet Streaming, Mono/Stereo version) of the song audio generally an mp3 downloaded from Optical CD, webserver, storage device. Predominant source section detection 102 separates the vocal/sung regions in the audio from the purely instrumental sections since only as the vocal regions are important from the singing scoring and mixing point of view. This step saves on processing in the instrumental regions in the song apart from helping achieve the synchronized alignment of the lyrics with the audio. Additionally a vocal-enhanced version of the vocal segments, where the relative intensity of the vocals in the polyphonic mixture is increased, is created from the stereo or mono original music, whichever is available, in order to facilitate metadata extraction from the vocal regions.

In reference to FIG. 4, a forced alignment of the lyrics 103 at the syllable level to the enhanced-vocal regions of the audio is implemented using automatic speech recognition techniques. The recognizer is previously trained on speech, singing, silence and instrumental background audio data to obtain acoustic models for the phones of the language, silence and instrumentation. The recognizer is adapted to work on long audio corresponding to entire songs by the use of phrase boundary detection and partial fragment recognition in the framework of dynamic programming optimization. A song-specific language model derived from the known lyrics helps improve the recognition.

Further, an audio fingerprint is extracted 107 from a limited duration of the original audio in a vocal region where the original singer's melodic pitch is varying. The audio fingerprint is a robust representation computed via short-time spectral analysis that later serves to detect an unusual degree of match between the user vocals and the reference audio that is suggestive of a cheating attempt. An additional instrumental region audio fingerprint is extracted for use in adaptive filtering out any feedback from external audio-speakers in the user recording at the mixing stage. The fingerprint is also used to adjust previously extracted media signal characteristics with the first media signal to identify matching parts.

Figure 5:
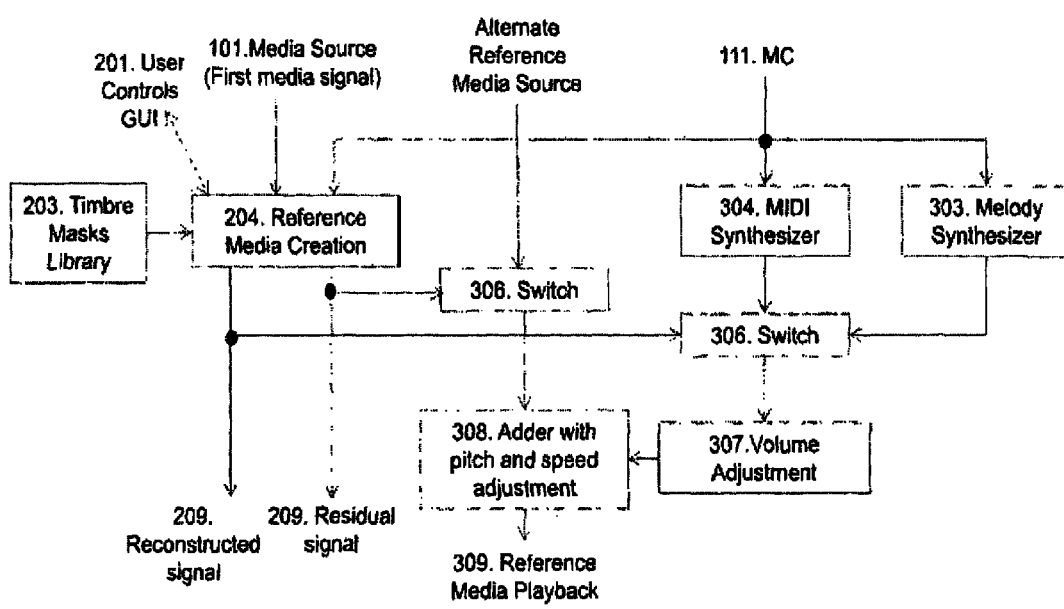
FIG. 5 illustrates creating of a reference media signal in accordance with an embodiment of the invention.

With the extracted media signal characteristics a reference media signal is created at step 3C. Reference is now made to FIG. 5, which illustrates creation of the reference media signal. According to the present invention, the reference media signal is created by suppressing a pre-dominant sound source of the first media signal i.e. lead vocal (or vocals, if the song is a duet) is suppressed to achieve the minus-1 version of the first media signal. If the first media signal is stereo or multi-channel, spatial cues are exploited to enhance the channel containing the lead vocals. Since this step typically achieves only incomplete separation of the lead vocals due to the presence of spatially co-located instruments such as the bass as well as leakage from other instruments due to the limitations of state-of-the-art methods of spatial-cue based separation, methods for single-channel separation are applied to the vocal channel by exploiting the dominance of the lead voice as well.

Further, creating the reference media signal includes synthesizing the predominant sound source using timbre masks from a predefined library 203 of timbre masks. Library 203 specifying the speech characteristics of the playback singer is provided if available. This library is previously derived by training on a small available dataset of songs of a playback singer. The library contains spectral envelopes in a pitch-independent form for the different phonemes of various original reference singers. Depending on the underlying phoneme as indicated by the song characteristics aligned lyrics and the detected singer vocal effort, a suitable timbre envelope is selected at each time instant to achieve the best separation of the vocal from the original audio. Accordingly, the pitch and aligned lyrics from the extracted media characteristics together with the timbre are useful in exploiting vocal signal characteristics for separation.

Thereafter the synthesized signal is subtracted from the first media signal. Further, if any residual echoes are found in the reference media signal, the residual echoes are removed by iteratively subtracting delayed versions of the synthesized signal from the reference media signal.

Accordingly, once the reference media signal is created at 204, there are two audio output files: a reconstruction and a residual file. The residual file is the background instrumentation only and serves as the reference media playback audio and the mixing audio for user version creation. The reconstruction signal represents the lead-singer's vocals in the media signal and is available if required as an attenuated guide track. Further, if time-scaling (slowing down) of the audio is required for a learner user, the background and vocals can be separately time-scaled using methods appropriate to each. A user interactive interface 201 is also available allowing for parameter selection and manual correction at every stage of the reference media creation based on audio-visual feedback.

FIG. 5 also shows the block diagram for synthesizing the reference media playback based on user settings for choice of guide track voice, whether original singer or instrument. Such system comprises of MIDI synthesizer. 304, melody synthesizer 303, switches 306, adder 308 and volume & speed adjustment 307. Further, the instrument voice can be synthesized to provide the melody in original or simplified notes form. The relative amplitudes of the reference media background and melody guide voice are adjusted with a user-selected setting. The reference media signal 309 is created by the residual combined, if desired, with a melody guide track. The melody guide track may be one of the following: an attenuated version of the extracted lead vocal, any chosen synthetic melodic instrument playing the original melody or playing the simplified notes representation, both of which are available in the characteristics of the media signal.

Referring now to FIG. 3, where the reference media signal is reproduced at step 3D and along with the reproduced reference media signal a user's media signal is received by the method to generate a second media signal.

At step 3E the second media signal is analysed to extract any media signal characteristics. The extracted media signal characteristics include time-stamps, pitch, onsets, tempo, notes, dynamics, pitch modulations, which are represented as a combination of a continuous pitch curve and a sequence of steady notes, peaks and harmonic tracks, octave of the predominant sound source, song-fingerprint and time-stamp of lyrics. The second media signal characteristics are extracted similar to the first media signal.

At step 3F, the characteristics of the second media signal are processed in isolation or in combination with the characteristics of the first media signal. Thereafter at step 3G, feedback is generated of the music performance of the user's media signal based upon the processed media signals. The feedback includes providing a scoring pattern and/or recommendations for the performance. The scoring pattern and/or recommendations are derived from a comparison/ analysis of extracted characteristics of the first media signal and the second media signal. According to the present invention, characteristics such as pitch, rhythm, pitch modulation, pronunciation, and quality of the media signals are compared. Each comparison/analysis results in a numerical score for a particular characteristic to arrive at a rating of the music performance.

Further, the step of generating feedback includes determining difficulty level of the first media signal based upon characteristics of the first media signal. Furthermore, generating feedback also takes into consideration octave mismatch of the first media signal and the second media signal. Accordingly, the scoring pattern may vary depending upon the difficulty level and/or octave mismatch. In this regard, when a music performance of different users is compared, the feedback takes into consideration the above factors i.e. the feedback is based upon difficulty level of the first media signal or reference media signal. Furthermore, the step of generating feedback includes recommending suitable musical key-shift of same first media signal, or other media signals for the user to sing, based on scoring pattern of the user and difficulty level of the first media signal Further, as shown in FIG. 3, the method proceeds to step 3H for verifying authenticity of the second media signal. The step of verifying authenticity of the second media signal provides an anti-cheat mechanism. To verify the authenticity of the second media signal, the present invention compares finger print of the second media signal with finger print of the first media signal. Also, the spectral features are analysed to identify if predominant sound source is present in the second media signal. Further, spectral features are analysed to identify humming, improper lyric singing, low-vocal effort/falsetto singing. Also, the pitch is analysed to identify if auto-correction has been applied to the second media signal. The result of each characteristic comparison/analysis is a binary output—true or false. i.e. providing information whether the second media signal is authentic or not.

Further as shown in FIG. 3, the method further proceeds to step 3I for creating a third media signal by combining the user's media signal and the reference media signal, wherein the user's media signal is modified and/or corrected depending upon feedback of the music performance. The third media signal is created by at-least time aligning user's media with reference media signal. Further the method identifies segments of the user's media signal with a negative feedback, and thereafter the signal is modified based to overcome the negative feedback.

Figure 6:
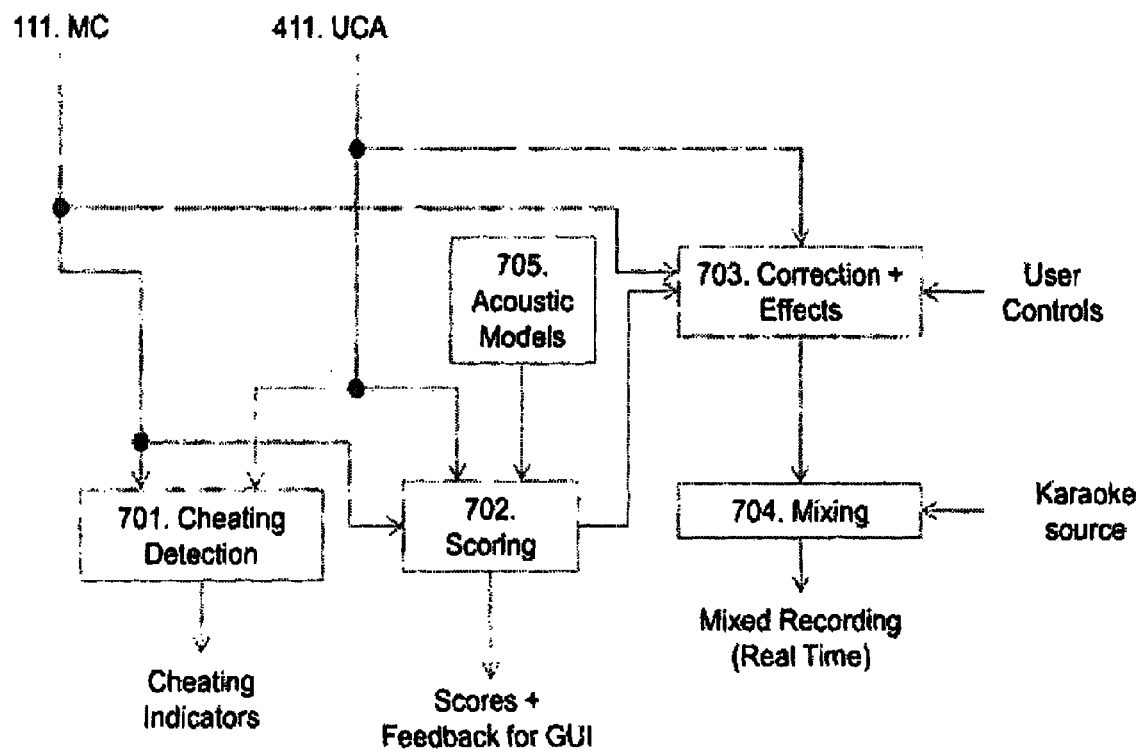
FIG. 6 illustrates processing of a music performance in accordance with an embodiment of the invention

FIG. 6 illustrates processing of a music performance in accordance with an embodiment of the invention. By way of an example, the music performance is a karaoke performance by a user i.e. a user sings along with a karaoke source of a song. As discussed above, a song is first analysed to extract metadata/characteristics of the song and the karaoke source is created from the extracted characteristic. The karaoke source is then replayed while the user records the song. The user recording is checked at 701 for intentional cheating that includes using the played back reference audio and the use of humming and other unacceptable singing styles. The user attributes such as pitch, onsets, volume dynamics and spectral coefficients are input to the scoring block 702 where the match with corresponding reference attributes from the song characteristics is carried out to determine the user scores on each musical dimension of melody, rhythm, expression, dynamics as well as pronunciation of lyrics. The melody scoring uses pitch matching based on music perception principles, i.e. steady regions are compared for interval correspondence but ornamented and transition pitch segments are evaluated based on underlying models that accommodate only musically relevant temporal variations and pitch modulations. The pronunciation scoring is based on the canonical behaviour of the spectral coefficients as represented by the available language and phone-dependent acoustic models. The octave information of the user and original singer enables accurate scoring irrespective of whether the user's gender is the same as that of the original singer. The scores and feedback for each vocal segment as well as overall feedback are provided via an audio-visual user interface. It may be noted that each vocal segment-level score is available for display in real-time i.e. as soon as the user completes singing the vocal segment. Finally, a score that is normalized for song difficulty (available in the song characteristics) is provided for application in an audition context where a common yardstick must be applied to singers rendering different songs. Additionally higher-level feedback may be provided such as recommendation to change the scale of the song to a more comfortable scale, suggestion to try another song (possibly of lower difficulty if the scores are low, or similar or greater difficulty if the scores are good). It is possible to obtain reference-song independent scoring as well based only on known parameters of musicality such as pitch and timing consistencies within the user recording.

Depending on user selected preferences, the user singing is corrected for pitch, timing and volume dynamics to match the corresponding reference attributes. The reference attributes are the stylized representations of the original singer attributes, as provided in the song characteristics. The corrections at 703 may be restricted to low scoring segments to enhance the naturalness of the final recording. Consonants and vowels are first identified using the known lyrics of song from the song characteristics, and then treated separately since each of these categories has fundamentally different attributes e.g. consonant sounds do not have any pitch. The user octave information is used for corrections to be applied appropriately for the gender of the user. Finally, the user selected audio effects are applied to the user recording. The enhanced user recording is mixed at 704 with the karaoke music to create a cover version of the reference song out of the user audio. This cover version can replace the original audio track of the original music video. This will give the feeling that the original artists or actors who appear in the original music video are lip synching for the user's voice.

Referring to FIG. 6, the user audio is processed for cheating detection and for scoring based on its musical attributes stored in the UCA. The scoring is with respect to the song characteristics. The score is displayed along with feedback for individual vocal segments in terms of each of the scoring dimensions. The user audio is subjected to correction, if desired by the user, and a choice of effects based on user-selected settings. The correction includes pitch, timing and volume dynamics correction of poorly scored vocal segments. The effected recording is then mixed with the karaoke source. The effects and mixing are designed to be achieved in real time i.e. the processing occurs concurrently with the user singing so that the enhanced and mixed audio is played out on the speakers with minimal latency.

Figure 7:
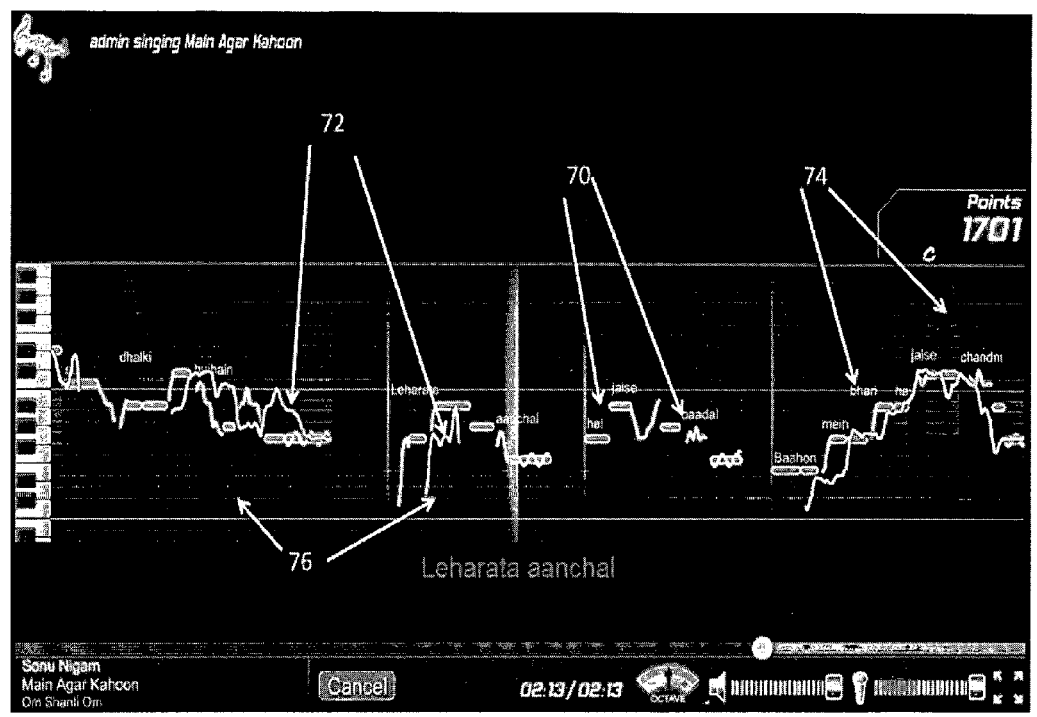
FIG. 7 illustrates a feedback provided to a user for a music performance in accordance with an embodiment of the invention.

The detailed feedback provided to the user is especially relevant in the field of music tutoring, where it is well researched that visual feedback enhances pitch acuity in singers/performers. An example of feedback for learning is shown in FIG. 7. A reference melody 70 is shown to the singer. Singer's pitch 72 is superimposed on the reference melody. As shown in the figure, correctly pitched segments 74 and incorrectly pitched segments 76 are also shown to the singer. This information is stored for multiple musical dimensions and can be used to focus on problem areas of the singer's singing skills by appropriately targeted learning modules. The availability of detailed song characteristics enables suggesting songs that are relevant to the singer's singing proficiency on different musical dimensions for encouragement.

All the work described is applicable to any musical media where there is a lead melodic instrument (not necessarily a human voice). Lyrics are not relevant in this case, but other instrumental attributes can be incorporated.

Since other modifications and changes to fit particular requirements and environments will be apparent to those skilled in the art, the invention is not considered limited as described by the present preferred embodiments which have been chosen for purposes of disclosure, and covers all changes and modifications which do not constitute departure from the spirit and scope of this invention.

We claim:

1. A method for processing a music performance, the method comprising the steps of:
   receiving a first media signal from a media source;
   analyzing the first media signal to extract any media signal characteristics;
   creating a reference media signal by suppressing at-least a predominant sound source of the first media signal;
   reproducing the reference media signal while receiving a user's media signal from an input device to generate a second media signal;
   analyzing the second media signal to extract any media signal characteristics;
   verifying authenticity of the second media signal in isolation or in combination with the media signal characteristics of the first media signal;
   processing the characteristics of the second media signal in isolation or in combination with the characteristics of the first media signal; and
   generating feedback for the music performance based upon the processed media signals.

2. The method as claimed in claim 1, wherein the characteristics extracted from the first media signal or the second media signal include time-stamps, pitch, onsets, tempo, notes, dynamics, pitch modulations, which are represented as a combination of a continuous pitch curve and a sequence of steady notes, peaks and harmonic tracks, octave of the predominant sound source, song-fingerprint and time-stamp of lyrics.

3. The method as claimed in claim 1, wherein creating the reference media signal includes:
   synthesizing the predominant sound source using timbre masks from a predefined library of timbre masks,
   subtracting the synthesized signal from the first media signal, and
   removing any residual echoes by iteratively subtracting delayed versions of the synthesized signal from the reference media signal.

4. The method as claimed in claim 1, wherein the step of generating feedback includes providing a scoring pattern for the music performance.

5. The method as claimed in claim 1, wherein the step of generating feedback includes determining difficulty level of the first media signal based upon characteristics of the first media signal.

6. The method as claimed in claim 1, wherein the step of generating feedback includes determining octave mismatch of the first media signal and the second media signal.

7. The method as claimed in claim 1, wherein the step of generating feedback includes providing a comparison of music performance of different users for the same or different first media signal or reference media signal based upon difficulty level of the first media signal.

8. The method as claimed in claim 1, wherein the step of generating feedback includes recommending suitable musical key-shift of same first media signal, or other media signals for the user to sing, based on scoring pattern of the user and difficulty level of the first media signal.

9. The method as claimed in claim 1, wherein the step of providing a scoring pattern includes comparing/analyzing any one or more of pitch, rhythm, pitch modulation, pronunciation, and quality of the first and second media signal.

10. The method as claimed in claim 1, wherein the step of verifying authenticity of the second media signal includes:
   a. analyzing spectral features to identify if predominant sound source is present in the second media signal, or
   b. comparing the finger print of the second media signal with the finger print of the first media signal, or
   c. analyzing spectral features to identify humming and improper-lyric singing, or
   d. analyzing pitch to identify if auto-correction has been applied, or
   e. analyzing spectral features to identify low-vocal effort/falsetto singing.

11. The method as claimed in claim 1, further comprising the step of creating a third media signal by combining second media signal and reference media signal.

12. The method as claimed in claim 11, wherein the step of creating the third media signal includes time aligning user's media with reference media signal.

13. The method as claimed in claim 11, wherein the step of creating the third media signal includes modifying the user's media signal.

14. The method as claimed in claim 11, wherein the step of creating the third media signal includes the step of correcting the user's media signal depending upon the feedback generated for the user's media signal.

15. The method as claimed in claim 14, wherein the step of correcting the user's media signal comprises: (i) identifying segments of the user's media signal with a negative feedback, and (ii) modifying the user's media signal to overcome the negative feedback.

16. The method as claimed in claim 1, wherein previously extracted media signal characteristics are adjusted with the first media signal by using the fingerprint to identify matching parts.

17. A system for processing a music performance, the system comprising:
   a receiver configured to receive a first media signal from a first media source and a user's media signal from a second media source; and
   a processor configured to:
      analyze the first media signal to extract any media signal characteristics,
      creating a reference media signal by suppressing at-least a predominant sound source of the first media signal,
      reproduce the reference media signal while receiving the user's media signal from the input device to generate a second media signal,
      analyze the second media signal to extract any media signal characteristics,
      verify authenticity of the second media signal in isolation or in combination with the media signal characteristics of the first media signal,
      process the characteristics of the second media signal in isolation or in combination with the characteristics of the first media signal, and
      generate feedback for the music performance based upon the processed media signals.

18. The system as claimed in claim 17, wherein to verify authenticity of the second media signal, the processor is further configured to:
   a. analyze spectral features to identify if predominant sound source is present in the second media signal, or
   b. compare the finger print of the second media signal with the finger print of the first media signal, or
   c. analyze spectral features to identify humming and improper-lyric singing, or
   d. analyze pitch to identify if auto-correction has been applied, or
   e. analyze spectral features to identify low-vocal effort/falsetto singing.

19. The system as claimed in claim 17, wherein the processor is further configured to create a third media signal by combining second media signal and reference media signal.

* * * * *